US011291059B2

(12) United States Patent
Zhang et al.

(10) Patent No.: US 11,291,059 B2
(45) Date of Patent: Mar. 29, 2022

(54) METHODS, USER EQUIPMENT AND BASE STATION FOR SIDELINK IDENTIFICATION

(71) Applicant: Telefonaktiebolaget LM Ericsson (publ), Stockholm (SE)

(72) Inventors: Zhang Zhang, Beijing (CN); Ricardo Blasco Serrano, Espoo (FI); Shehzad Ali Ashraf, Aachen (DE); Marco Belleschi, Solna (SE)

(73) Assignee: Telefonaktiebolaget LM Ericsson (Publ) Stockholm, Sweden, Stockholm (SE)

( * ) Notice: Subject to any disclaimer, the term of this patent is extended or adjusted under 35 U.S.C. 154(b) by 87 days.

(21) Appl. No.: 16/331,446

(22) PCT Filed: Aug. 3, 2018

(86) PCT No.: PCT/CN2018/098488
§ 371 (c)(1),
(2) Date: Mar. 7, 2019

(87) PCT Pub. No.: WO2020/024251
PCT Pub. Date: Feb. 6, 2020

(65) Prior Publication Data

US 2020/0337096 A1 Oct. 22, 2020

(51) Int. Cl.
*H04W 76/11* (2018.01)
*H04W 4/40* (2018.01)
(Continued)

(52) U.S. Cl.
CPC ........... *H04W 76/11* (2018.02); *H04L 1/0061* (2013.01); *H04W 4/40* (2018.02); *H04W 72/0466* (2013.01); *H04W 92/18* (2013.01)

(58) Field of Classification Search
CPC .................. H04L 1/0061; H04W 4/40; H04W 12/04031; H04W 40/246; H04W 52/0212;
(Continued)

(56) References Cited

U.S. PATENT DOCUMENTS 8,989,389 B2 * 3/2015 Hakola ............. H04W 12/0401 380/279
9,642,128 B2 * 5/2017 Kim .................... H04W 40/246
(Continued)

FOREIGN PATENT DOCUMENTS

CN 102812688 A * 12/2012 ........ H04W 12/0401
CN 104936160 A * 9/2015 ............ H04W 76/11
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.1, Mar. 2017, 1-106.
(Continued)

*Primary Examiner* — Eric Nowlin
(74) *Attorney, Agent, or Firm* — Christopher & Weisberg, P.A.

(57) ABSTRACT

Methods, a user equipment (UE) and a base station are disclosed for sidelink identification. According to an embodiment, a first UE participates in an identity (ID) determination procedure such that a sidelink ID is determined for a sidelink between the first UE and a second UE. The sidelink ID comprises a full ID for identifying one of the first and second UEs and a short ID for identifying the other of the first and second UEs.

18 Claims, 14 Drawing Sheets

LTE
D2D

(51) Int. Cl.
*H04L 1/00* (2006.01)
*H04W 72/04* (2009.01)
*H04W 92/18* (2009.01)

(58) Field of Classification Search
CPC . H04W 72/0466; H04W 76/11; H04W 76/14; H04W 76/23; H04W 92/18
See application file for complete search history.

(56) References Cited

U.S. PATENT DOCUMENTS 9,660,804 B2* 5/2017 Liu ........ H04L 67/104
9,668,194 B2* 5/2017 Baligh ........ H04W 40/02
9,681,472 B2* 6/2017 Sorrentino ........ H04W 56/0015
10,158,625 B2* 12/2018 Liu ........ H04W 76/14
10,484,866 B2* 11/2019 Huang ........ H04W 4/00
10,499,241 B2* 12/2019 Kela ........ H04W 8/26
10,568,153 B2* 2/2020 Baligh ........ H04W 28/0278
10,588,160 B2* 3/2020 Yi ........ H04L 61/6022
10,638,342 B2* 4/2020 Eckardt ........ H04W 76/14
10,805,972 B2* 10/2020 Baligh ........ H04W 40/16
10,904,787 B2* 1/2021 Pan ........ H04W 4/40
11,019,670 B1* 5/2021 Pan ........ H04W 76/14
2013/0013926 A1* 1/2013 Hakola ........ H04W 12/0401 713/171
2013/0040677 A1* 2/2013 Lee ........ H04W 8/26 455/509
2013/0208697 A1* 8/2013 Hwang ........ H04W 36/08 370/331
2014/0094183 A1* 4/2014 Gao ........ H04W 72/04 455/450
2014/0192735 A1* 7/2014 Sridharan ........ H04L 61/2038 370/329
2015/0043455 A1* 2/2015 Miklos ........ H04W 76/11 370/329
2015/0099514 A1* 4/2015 Sartori ........ H04W 76/27 455/434
2015/0139197 A1* 5/2015 He ........ H04W 24/02 370/336
2015/0281953 A1* 10/2015 Liu ........ H04W 76/14 380/283
2015/0365942 A1* 12/2015 Niu ........ H04W 48/14 370/330
2016/0128093 A1* 5/2016 Lee ........ H04W 72/14 370/329
2016/0134418 A1* 5/2016 Liu ........ H04L 67/104 713/171
2016/0219132 A1* 7/2016 Lee ........ H04L 69/22
2016/0219636 A1* 7/2016 Fujishiro ........ H04W 72/0453
2016/0226857 A1* 8/2016 Liu ........ H04W 12/06
2016/0227463 A1* 8/2016 Baugh ........ H04W 76/14
2016/0249355 A1* 8/2016 Chae ........ H04W 72/1263
2016/0278031 A1* 9/2016 Sorrentino ........ H04W 76/15
2016/0278136 A1* 9/2016 Sorrentino ........ H04W 4/80
2016/0344469 A1* 11/2016 Yi ........ H04W 76/14
2017/0127251 A1 5/2017 Yi et al.
2017/0188406 A1* 6/2017 Baligh ........ H04W 40/20
2017/0359116 A1* 12/2017 Hwang ........ H04B 17/309
2018/0220439 A1* 8/2018 Lee ........ H04W 72/14
2018/0249524 A1* 8/2018 Yi ........ H04L 61/6022
2018/0332491 A1* 11/2018 Eckardt ........ H04W 76/14
2019/0007827 A1* 1/2019 Huang ........ H04W 4/00
2019/0261443 A1* 8/2019 Baligh ........ H04W 76/14
2020/0329513 A1* 10/2020 Pan ........ H04W 76/11
2020/0337096 A1* 10/2020 Zhang ........ H04W 76/11
2020/0351699 A1* 11/2020 Pan ........ H04W 4/40
2021/0105653 A1* 4/2021 Pan ........ H04W 4/40
2021/0120592 A1* 4/2021 Takahashi ........ H04L 5/0053

FOREIGN PATENT DOCUMENTS

CN 102812688 B * 6/2016 ........ H04W 12/0401
CN 105940622 A 9/2016
CN 106470380 A * 3/2017 ........ H04W 4/00
CN 107302423 A 10/2017
CN 107432011 A 12/2017
CN 107995605 A 5/2018
CN 108028863 A * 5/2018 ........ H04W 74/0858
EP 2550789 A1 * 1/2013 ........ H04W 12/0401
EP 3100540 A1 * 12/2016 ........ H04W 56/0025
EP 2550789 A4 * 5/2017 ........ H04W 12/0401
EP 3100540 A4 * 9/2017 ........ H04W 4/80
EP 3337194 A1 * 6/2018 ........ H04W 4/00
EP 3337194 A4 * 6/2018 ........ H04W 4/00
EP 3100540 B1 * 7/2018 ........ H04W 56/0025
EP 3354108 A1 * 8/2018 ........ H04W 40/246
EP 2550789 B1 * 11/2018 ........ H04W 12/0401
EP 3354108 A4 * 4/2019 ........ H04W 40/246
EP 3628116 A1 * 4/2020 ........ H04W 16/14
EP 3628116 A4 * 5/2020 ........ H04L 67/141
KR 20130016591 A * 2/2013 ........ H04W 8/26
WO WO-2011117677 A1 * 9/2011 ........ H04W 12/0401
WO WO-2013044718 A1 * 4/2013 ........ H04W 72/042
WO WO-2017028610 A1 * 2/2017 ........ H04W 4/00
WO WO-2017052103 A1 * 3/2017 ........ H04W 74/0858
WO 2017075798 A1 5/2017
WO WO-2017107011 A1 * 6/2017 ........ H04W 56/0025
WO WO-2020024251 A1 * 2/2020 ........ H04L 67/141

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.1.1, Jan. 2017, 1-149.

3GPP, "3rd Generation Partnership Project; Technical Specification Group Radio Access Network; Evolved Universal Terrestrial Radio Access (E-UTRA); Physical layer procedures (Release 14)", 3GPP TS 36.213 V14.2.0, Mar. 2017, 1-7.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.2, Apr. 2017, 1-721.

3GPP, "3rd Generation Partnership Project; Technical Specification Group Services and System Aspects; Service Yequirements for V2X services; Stage 1 (Release 14)", 3GPP TS 22.185 V14.2.1, Nov. 2016, 1-14.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.5.0, Mar. 2015, pp. 1-252.

Unknown, Author, "Discussion on Sidelink design aspects for 1 PRB BW limited UEs", 3GPP TSG RAN WG1 Meeting #90, R1-1712922, Prague, Czech Republic, Aug. 21-25, 2017, pp. 1-4.

* cited by examiner

Participate in an ID determination procedure such that a sidelink ID is determined for a sidelink between a first UE and a second UE, the sidelink ID comprising a full ID for identifying one of the first and second UEs and a short ID for identifying the other of the first and second UEs

202

METHODS, USER EQUIPMENT AND BASE STATION FOR SIDELINK IDENTIFICATION

TECHNICAL FIELD

Embodiments of the disclosure generally relate to wireless communication, and, more particularly, to methods, a user equipment and a base station for sidelink identification.

BACKGROUND

This section introduces aspects that may facilitate better understanding of the present disclosure. Accordingly, the statements of this section are to be read in this light and are not to be understood as admissions about what is in the prior art or what is not in the prior art.

Device-to-device (D2D) communication in cellular networks is defined as direct communication between two terminal devices without traversing the base station or core network. In Release 14 and Release 15 of 3rd generation partnership project (3GPP), the extensions for the D2D work comprise support for vehicle-to-everything (V2X) communication. In Release 16, 3GPP will study and possibly specify V2X communication using new radio (NR). There are mainly three use cases defined for V2X: vehicle-to-vehicle (V2V), vehicle-to-pedestrian (V2P) and vehicle-to-infrastructure/network (V2I/N). Thus, V2X communication includes any combination of direct communication between vehicles, pedestrians and infrastructure.

Because long term evolution (LTE) has economies of scale and may enable tighter integration between V2I and V2V/V2P communications, providing an LTE-based V2X interface may be economically advantageous, as compared to using a dedicated V2X technology such as institute of electrical and electronics engineers (IEEE) 802.11p. FIG. 1 shows V2X scenarios for an LTE-based network. V2V covers LTE-based communication between vehicles, either via Uu or sidelink. The Uu refers to the radio interface between a user equipment (UE) and an evolved node B (eNB). The sidelink may refer to a direct communication interface between UEs (also referred to as PC5 interface in LTE). V2P covers LTE-based communication between a vehicle and a device carried by an individual (e.g. handheld terminal carried by a pedestrian, cyclist, driver or passenger), either via Uu or sidelink. V2I/N covers LTE-based communication between a vehicle and a roadside unit/network. A roadside unit (RSU) is a transportation infrastructure entity (e.g. an entity transmitting speed notifications) that communicates with V2X capable UEs over sidelink or over Uu. For V2N, the communication is performed via Uu.

Currently in Release 14/15, there are two different resource allocation (RA) procedures for V2X on sidelink, i.e. centralized RA (so-called "mode-3") and distributed RA (so-called "mode-4"). The transmission resources are selected within a resource pool which is predefined or configured by the network (NW). With centralized RA (i.e. mode-3), the sidelink radio resource for transmission is scheduled/allocated by the NW. The allocation is signaled to a UE using downlink control information (DCI) format 5/5A. With distributed RA (i.e. mode-4), each device independently decides which radio resource to use for each transmission based on sensing. For both RA modes, sidelink control information (SCI) is transmitted on physical sidelink control channel (PSCCH) to indicate the assigned sidelink resource.

The sensing is based on decoding of SCI and reference signal receiving power (RSRP) measurement of physical sidelink shared channel (PSSCH) from surrounding UEs. To enable such sensing based resource allocation, no UE specific scrambling is adopted which implies on sidelink a UE cannot be recognized in layer 1 (L1). The SCI has two formats, i.e. SCI format 0 and SCI format 1. SCI format 0 indicates the resource blocks being reserved for the current transmission, modulation and coding scheme (MCS), and a (group) destination identity (ID). SCI format 1 indicates the resource blocks being reserved for the current transmission and for a future transmission, MCS and priority. Higher layer configures the maximum and minimum MCS that could be used on sidelink and the actual used MCS is selected depending on sidelink traffic load, vehicle moving speed, service type, etc. There is currently no channel state information (CSI) for LTE based sidelink. Currently blind hybrid automatic repeat request (HARQ) retransmission without HARQ feedback is adopted for sidelink. Resources used for retransmission are also indicated in SCI.

For sidelink shared channel (SL-SCH), it maps to PSSCH on medium access control (MAC) layer. Currently the SL-SCH MAC header is of variable size and comprises fields with field names "V", "SRC", "DST", "LCID", "L", "F", "E" and "R". The V field refers to MAC protocol data unit (PDU) format version number field and indicates which version of the SL-SCH subheader is used. The SRC field refers to source layer-2 ID field and carries the identity of the source. It is set to the proximity-based services (ProSe) UE ID. The SRC field size is 24 bits. The DST field refers to destination layer-2 ID field and can be 16 bits or 24 bits. If it is 16 bits, it carries the 16 most significant bits of the destination layer-2 ID. If it is 24 bits, it is set to the destination layer-2 ID. The LCID field refers to logical channel ID field and uniquely identifies the logical channel instance within the scope of one source layer-2 ID and destination layer-2 ID pair of the corresponding MAC service data unit (SDU). The L field refers to length field and indicates the length of the corresponding MAC SDU in bytes. The F field refers to format field and indicates the size of the length field. The E field refers to extension field and is a flag indicating whether more fields are present in the MAC header or not. The R field refers to reserved bit field and is set to "0".

For V2X sidelink communication using broadcast, the destination layer-2 ID is set to the identifier provided by upper layers. Source and destination layer-2 IDs are used in the MAC header of SL-SCH so that the receiving MAC entity can identify the type of the received packet and whether the packet is of interest to it, and/or it can know whether the packet is intended to it.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide solutions for sidelink identification.

According to one aspect of the disclosure, there is provided a method implemented at a first UE. The method comprises participating in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, participating in the ID determination procedure comprises, when a first predetermined condition is satisfied, determining that the first UE is to be identified by a full ID and the second UE is to be identified by a short ID. Participating in the ID determination procedure further comprises determining a full ID of the first UE. Participating in the ID determination procedure further comprises determining a short ID for the second UE. Participating in the ID determination procedure further comprises sending the full ID of the first UE and the short ID for the second UE to the second UE or a base station.

In an embodiment of the disclosure, participating in the ID determination procedure comprises, when a second predetermined condition is satisfied, determining that the first UE is to be identified by a short ID and the second UE is to be identified by a full ID. Participating in the ID determination procedure further comprises receiving a short ID for the first UE and a full ID of the second UE from the second UE or a base station.

In an embodiment of the disclosure, the first predetermined condition is one of: the first UE is to receive data from the second UE; the first UE is to transmit data to the second UE; a full ID of the first UE is smaller than a full ID of the second UE; a full ID of the first UE is larger than a full ID of the second UE; a number of simultaneous sidelinks in which the first UE is involved is smaller than a number of simultaneous sidelinks in which the second UE is involved; the first UE is a master UE and the second UE is a slave UE; and the first UE is in coverage of a base station and the second UE is out of coverage of the base station. The second predetermined condition is opposite to the first predetermined condition.

In an embodiment of the disclosure, a full ID for identifying one of the first and second UEs is a globally unique ID.

In an embodiment of the disclosure, a full ID for identifying one of the first and second UEs is a locally unique ID. Determining a full ID of the first UE comprises receiving the full ID of the first UE from a base station.

In an embodiment of the disclosure, a full ID for identifying one of the first and second UEs is a locally unique ID. Determining a full ID of the first UE comprises receiving, from one or more surrounding UEs, one or more full IDs which are being used by the one or more surrounding UEs. Determining a full ID of the first UE further comprises selecting, as the full ID of the first UE, from a predetermined pool of full IDs, a full ID that has not been used by the one or more surrounding UEs for a predetermined time period.

In an embodiment of the disclosure, the short ID is determined for the second UE based on a number of simultaneous sidelinks in which the first UE is or can be involved.

In an embodiment of the disclosure, participating in the ID determination procedure comprises sending information about the sidelink to a base station. Participating in the ID determination procedure further comprises receiving the sidelink ID from the base station.

In an embodiment of the disclosure, the method further comprises sending the received sidelink ID to the second UE on the sidelink.

In an embodiment of the disclosure, the information about the sidelink comprises a full ID of the second UE and a number of simultaneous sidelinks in which the first UE is or can be involved.

In an embodiment of the disclosure, the method further comprises generating a data packet that contains at least information about the short ID of the sidelink ID. The method further comprises encoding the data packet. The method further comprises transmitting the encoded data packet to the second UE on the sidelink. The data packet further contains information about the full ID of the sidelink ID, or encoding the data packet comprises scrambling the data packet with the full ID of the sidelink ID.

In an embodiment of the disclosure, the data packet contains a short ID for the first UE and a cyclic redundancy check (CRC) value obtained based on a full ID of the second UE. Alternatively, the data packet contains a short ID for the second UE and a CRC value obtained based on a full ID of the first UE. Alternatively, the data packet contains a short ID for the first UE or a CRC value obtained based on the short ID for the first UE, and the data packet is scrambled with a full ID of the second UE.

In an embodiment of the disclosure, the method further comprises receiving an encoded data packet from the second UE on the sidelink. The method further comprises decoding the encoded data packet into a data packet. The method further comprises obtaining at least the short ID of the sidelink ID from the data packet. Decoding the encoded data packet comprises descrambling, with the full ID of the sidelink ID, a scrambled data packet, or the full ID of the sidelink ID is further obtained from the data packet.

In an embodiment of the disclosure, obtaining the short ID of the sidelink ID comprises extracting a short ID for the first UE from the data packet, and obtaining the full ID of the sidelink ID comprises extracting a CRC value from the data packet and checking the CRC value with a full ID of the second UE. Alternatively, obtaining the short ID of the sidelink ID comprises extracting a short ID for the second UE from the data packet, and obtaining the full ID of the sidelink ID comprises extracting a CRC value from the data packet and checking the CRC value with a full ID of the first UE. Alternatively, obtaining the short ID of the sidelink ID comprises extracting a short ID for the second UE from the data packet, or extracting a CRC value from the data packet and checking the CRC value with a short ID for the second UE, and decoding the encoded data packet comprises descrambling, with the full ID of the first UE, a scrambled data packet.

In an embodiment of the disclosure, the method further comprises, when performing transmission/reception of data carrying sidelink related information to/from a base station, identifying the corresponding sidelink with a short ID for the second UE or a full ID of the second UE.

In an embodiment of the disclosure, the sidelink is a unicast sidelink or a multicast sidelink, and the sidelink ID is used to identify the sidelink on layer 1 (L1).

In an embodiment of the disclosure, the method further comprises providing user data and forwarding the user data to a host computer via the transmission to the base station.

According to another aspect of the disclosure, there is provided a method implemented at a base station. The method comprises participating in an ID determination procedure such that a sidelink ID is determined for a sidelink between a first UE and a second UE. The sidelink ID comprises a full ID for identifying one of the first and second UEs and a short ID for identifying the other of the first and second UEs.

In an embodiment of the disclosure, participating in the ID determination procedure comprises receiving information about the sidelink from one of the first and second UEs. Participating in the ID determination procedure further comprises, when a first predetermined condition is satisfied, determining that the first UE is to be identified by a full ID and the second UE is to be identified by a short ID. Participating in the ID determination procedure further comprises determining a full ID of the first UE. Participating in the ID determination procedure further comprises determining a short ID for the second UE. Participating in the ID determination procedure further comprises sending the full ID of the first UE and the short ID for the second UE to the one of the first and second UEs.

In an embodiment of the disclosure, the method further comprises sending the full ID of the first UE and the short ID for the second UE to the other of the first and second UEs.

In an embodiment of the disclosure, the first predetermined condition is one of: the first UE is to receive data from the second UE; the first UE is to transmit data to the second UE; a full ID of the first UE is smaller than a full ID of the second UE; a full ID of the first UE is larger than a full ID of the second UE; a number of simultaneous sidelinks in which the first UE is involved is smaller than a number of simultaneous sidelinks in which the second UE is involved; the first UE is a master UE and the second UE is a slave UE; and the first UE is in coverage of the base station and the second UE is out of coverage of the base station.

In an embodiment of the disclosure, a full ID for identifying one of the first and second UEs is a locally unique ID allocated by the base station or a globally unique ID.

In an embodiment of the disclosure, the short ID is determined for the second UE based on a number of simultaneous sidelinks in which the first UE is or can be involved.

In an embodiment of the disclosure, participating in the ID determination procedure comprises receiving the sidelink ID from one of the first and second UEs. Participating in the ID determination procedure further comprises sending the received sidelink ID to the other of the first and second UEs.

In an embodiment of the disclosure, the method further comprises, when performing transmission/reception of data carrying sidelink related information to/from the first UE, identifying the corresponding sidelink with a short ID for the second UE or a full ID of the second UE.

According to another aspect of the disclosure, there is provided a first UE. The first UE comprises at least one processor and at least one memory. The at least one memory contains instructions executable by the at least one processor, whereby the first UE is operative to participate in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the UE is operative to perform the method according to the above aspect.

According to another aspect of the disclosure, there is provided a base station. The base station comprises at least one processor and at least one memory. The at least one memory contains instructions executable by the at least one processor, whereby the base station is operative to participate in an ID determination procedure such that a sidelink ID is determined for a sidelink between a first UE and a second UE. The sidelink ID comprises a full ID for identifying one of the first and second UEs and a short ID for identifying the other of the first and second UEs.

In an embodiment of the disclosure, the base station is operative to perform the method according to the above aspect.

According to another aspect of the disclosure, there is provided a computer program product. The computer program product comprises instructions which when executed by at least one processor, cause the at least one processor to perform the method according to the above aspect.

According to another aspect of the disclosure, there is provided a computer readable storage medium. The computer readable storage medium comprises instructions which when executed by at least one processor, cause the at least one processor to perform the method according to the above aspect.

According to another aspect of the disclosure, there is provided a UE. The UE comprises a participation module for participating in an ID determination procedure such that a sidelink ID is determined for a sidelink between the first UE and a second UE. The sidelink ID comprises a full ID for identifying one of the first and second UEs and a short ID for identifying the other of the first and second UEs.

According to another aspect of the disclosure, there is provided a base station. The base station comprises a participation module for participating in an ID determination procedure such that a sidelink ID is determined for a sidelink between a first UE and a second UE. The sidelink ID comprises a full ID for identifying one of the first and second UEs and a short ID for identifying the other of the first and second UEs.

According to some embodiment(s) of the disclosure, the overhead for uniquely identifying a sidelink transmission can be reduced.

According to another aspect of the disclosure, there is provided a method implemented in a communication system including a host computer, a base station and a first UE. The method comprises, at the host computer, providing user data. The method further comprises, at the host computer, initiating a transmission carrying the user data to the first UE via a cellular network comprising the base station. The base station participates in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the method further comprises, at the base station, transmitting the user data.

In an embodiment of the disclosure, the user data is provided at the host computer by executing a host application. The method further comprises, at the first UE, executing a client application associated with the host application.

According to another aspect of the disclosure, there is provided a communication system including a host computer. The host computer comprises processing circuitry configured to provide user data, and a communication interface configured to forward the user data to a cellular network for transmission to a first UE. The cellular network comprises a base station having a radio interface and processing circuitry. The base station's processing circuitry is configured to participate in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the communication system further includes the base station.

In an embodiment of the disclosure, the communication system further includes the first UE. The first UE is configured to communicate with the base station.

In an embodiment of the disclosure, the processing circuitry of the host computer is configured to execute a host application, thereby providing the user data. The first UE comprises processing circuitry configured to execute a client application associated with the host application.

According to another aspect of the disclosure, there is provided a method implemented in a communication system including a host computer, a base station and a first UE. The method comprises, at the host computer, providing user data. The method further comprises, at the host computer, initiating a transmission carrying the user data to the first UE via a cellular network comprising the base station. The first UE participates in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the method further comprises, at the first UE, receiving the user data from the base station.

According to another aspect of the disclosure, there is provided a communication system including a host computer. The host computer comprises processing circuitry configured to provide user data and a communication interface configured to forward user data to a cellular network for transmission to a first UE. The first UE comprises a radio interface and processing circuitry. The first UE's processing circuitry is configured to participate in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the communication system further includes the first UE.

In an embodiment of the disclosure, the cellular network further includes a base station configured to communicate with the first UE.

In an embodiment of the disclosure, the processing circuitry of the host computer is configured to execute a host application, thereby providing the user data. The first UE processing circuitry is configured to execute a client application associated with the host application.

According to another aspect of the disclosure, there is provided a method implemented in a communication system including a host computer, a base station and a first UE. The method comprises, at the host computer, receiving user data transmitted to the base station from the first UE. The first UE participates in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the method further comprises, at the first UE, providing the user data to the base station.

In an embodiment of the disclosure, the method further comprises, at the first UE, executing a client application, thereby providing the user data to be transmitted. The method further comprises, at the host computer, executing a host application associated with the client application.

In an embodiment of the disclosure, the method further comprises, at the first UE, executing a client application. The method further comprises, at the first UE, receiving input data to the client application. The input data is provided at the host computer by executing a host application associated with the client application. The user data to be transmitted is provided by the client application in response to the input data.

According to another aspect of the disclosure, there is provided a communication system including a host computer. The host computer comprises a communication interface configured to receive user data originating from a transmission from a first UE to a base station. The first UE comprises a radio interface and processing circuitry. The first UE's processing circuitry is configured to participate in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the communication system further includes the first UE.

In an embodiment of the disclosure, the communication system further includes the base station. The base station comprises a radio interface configured to communicate with the first UE and a communication interface configured to forward to the host computer the user data carried by a transmission from the first UE to the base station.

In an embodiment of the disclosure, the processing circuitry of the host computer is configured to execute a host application. The first UE's processing circuitry is configured to execute a client application associated with the host application, thereby providing the user data.

In an embodiment of the disclosure, the processing circuitry of the host computer is configured to execute a host application, thereby providing request data. The first UE's processing circuitry is configured to execute a client application associated with the host application, thereby providing the user data in response to the request data.

According to another aspect of the disclosure, there is provided a method implemented in a communication system including a host computer, a base station and a first UE. The method comprises, at the host computer, receiving, from the base station, user data originating from a transmission which the base station has received from the first UE. The base station participates in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the method further comprises, at the base station, receiving the user data from the first UE.

In an embodiment of the disclosure, the method further comprises, at the base station, initiating a transmission of the received user data to the host computer.

According to another aspect of the disclosure, there is provided a communication system including a host computer. The host computer comprises a communication interface configured to receive user data originating from a transmission from a first UE to a base station. The base station comprises a radio interface and processing circuitry. The base station's processing circuitry is configured to participate in an ID determination procedure such that a sidelink ID is determined for a sidelink between the first UE and a second UE. The sidelink ID comprises a full ID for identifying one of the first and second UEs and a short ID for identifying the other of the first and second UEs.

In an embodiment of the disclosure, the communication system further includes the base station.

In an embodiment of the disclosure, the communication system further includes the first UE. The first UE is configured to communicate with the base station.

In an embodiment of the disclosure, the processing circuitry of the host computer is configured to execute a host application. The first UE is configured to execute a client application associated with the host application, thereby providing the user data to be received by the host computer.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figures 1, 2:
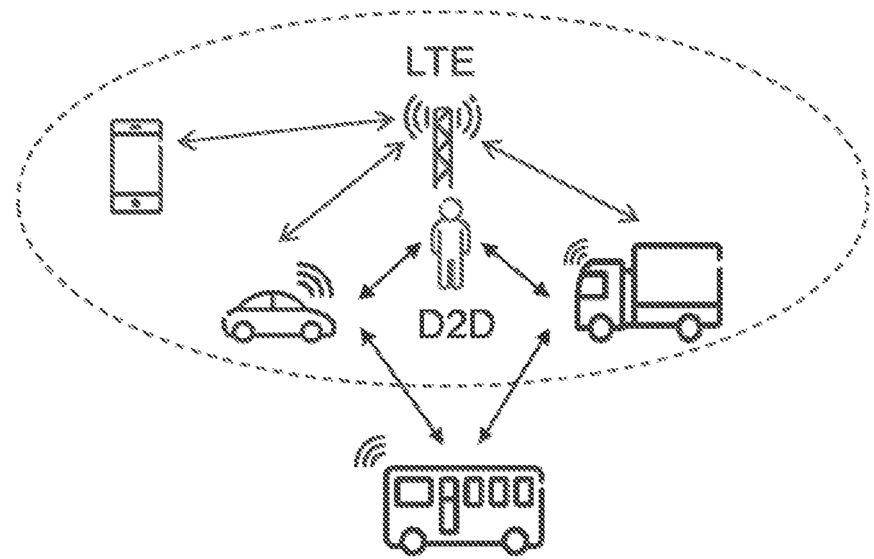
FIG. 1 shows V2X scenarios for an LTE-based network.
FIG. 2 is a flowchart illustrating a method implemented at a first UE according to an embodiment of the disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

3GPP SA1 working group has completed new service requirements for future V2X services in the FS_eV2X. The term "SA" refers to standalone, the term "FS" refers to feasibility study and the term "eV2X" refers to enhanced V2X. The SA1 working group has identified 25 use cases for advanced V2X services which will be used in LTE and NR. Such use cases are categorized into four use case groups: vehicles platooning, extended sensors, advanced driving and remote driving. Direct unicast transmission over sidelink will be needed in some use cases such as platooning, cooperative driving, dynamic ride sharing, etc.

The consolidated requirements for each use case group are captured in technical report (TR) 22.886. For these advanced applications, the expected requirements to meet the needed data rate, capacity, reliability, latency, communication range and speed are made more stringent. In order to meet these requirements, some improvements (for example, link adaption for sidelink based on e.g. CSI feedback, more HARQ processes and adaptive HARQ retransmissions for sidelink based on HARQ feedback, etc.) need to be introduced.

At the same time, there are several use cases which (only) require unicast transmissions. Therefore, NR will support unicast transmission on sidelink and there will be layer 1 (L1) signaling that is only relevant for this unicast transmission. For example, L1 feedbacks such as CSI reports and HARQ acknowledgement/non-acknowledgement (Ack/Nack) may be used to increase spectral efficiency and/or reliability. Also, a UE may maintain multiple unicast sidelinks to different UEs simultaneously. These may be used for transmission, reception, or both. Therefore, for proper operation of the system, it is necessary that the radio layers are able to identify unambiguously each of the sidelinks on L1 to correctly transmit/receive the L1 signaling. In this way, a UE is able to identify for which particular sidelink (i.e. UE-UE pair) the transmission belongs to. Furthermore, in some cases, it is necessary that other nodes in the network are able to identify the sidelink connections in which a UE is involved. For example, a gNB controlling a UE should be able to distinguish all its sidelink connections. This is necessary for the gNB to send and receive the correct commands/information and take the correct decisions for each sidelink (e.g., allocate resources, signal the transport format to use, request or receive channel state information reports, and so on).

In traditional cellular communication (i.e. uplink and downlink), it is the base station (e.g. eNB/gNB) that allocates a unique network identity (e.g. cell radio network temporary identifier simply referred to as C-RNTI) to a connected UE. With the help of this unique identifier, the UE is able to know whether the transmission is intended for it or not on L1. However, currently there is no L1 mechanism that allows either a base station (i.e. eNB/gNB) or a UE to uniquely identify each sidelink on which the UE is transmitting or receiving.

The absence of such L1 mechanism may create the following problems. Firstly, for example, a UE may be transmitting and receiving data (and its corresponding L1 signalling such as HARQ Ack/Nack and CSI reports) on multiple sidelinks at the same time. However, due to lack of sidelink identification mechanism on L1, the UE will not be able to know which L1 signaling is relevant to each of its sidelinks. As a consequence, the UE cannot operate correctly with CSI/HARQ feedback, etc. In current technical specification, the MAC header of SL-SCH conveys source and destination address, but such information is not visible to L1.

Secondly, for example, a gNB may receive L1 control information originating from a sidelink (e.g., relayed through uplink), e.g. HARQ/CSI feedbacks, but it may not be able to identify the sidelink corresponding to the particular L1 control information. Consequently, the gNB cannot operate the corresponding sidelink (or configure transmissions) correctly for the UEs.

Identifying the sidelinks directly with the combination of paired UE IDs (i.e. source and destination IDs) is usually not feasible for L1 signaling due to the associated overhead. For example, in LTE sidelink, this would take approximately 48 bits (24 bits to identify the source address and 24 bits to identify the destination address). It is clearly not practical to use these IDs compared to conveying feedback (Ack/Nack i.e. 1 or a few bits), SCI (i.e. about 40 bits), or packets of similar sizes (e.g. CSI reports, etc.).

The present disclosure proposes solutions for sidelink identification. These solutions may be applied to a wireless communication system including a UE and a base station. The UE can communicate through a radio access communication link with the base station. The base station can provide radio access communication links to UEs that are within its communication service cell. The base station may be, for example, an eNB in LTE or a gNB in NR. Note that the communications may be performed between the UE and the base station according to any suitable communication standards and protocols. The UE may also be referred to as, for example, mobile station, mobile unit, subscriber station, access terminal, terminal device, or the like. It may refer to any end device that can access a wireless communication network and receive services therefrom. By way of example and not limitation, the UE may include portable computers, image capture terminal devices such as digital cameras, gaming terminal devices, music storage and playback appliances, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device, which may, in a 3GPP context, be referred to as a machine-type communication (MTC) device. Particular examples of such machines or devices may include sensors, metering devices such as power meters, industrial machinery, bikes, vehicles, or home or personal appliances, e.g. refrigerators, televisions, personal wearables such as watches, and so on.

Hereinafter, the solutions will be described in detail with reference to FIGS. 2-15. These solutions may be applied to LTE sidelink, NR sidelink, or any radio access technology (RAT) with a device-to-device mode supporting unicast or multicast transmissions. Although these solutions are described in the context of V2X scenarios, those skilled in the art can understand that the principle of the present disclose can also be applied to any other direct communication scenarios.

FIG. 2 is a flowchart illustrating a method implemented at a first UE according to an embodiment of the disclosure. At block 202, the first UE participates in an ID determination procedure such that a sidelink ID is determined for a sidelink between the first UE and a second UE. The sidelink ID comprises a full ID for identifying one of the first and second UEs and a short ID for identifying the other of the first and second UEs.

As an example, the sidelink may be a unicast sidelink. The sidelink ID may be used to identify the sidelink on L1 and may be a combination of a full ID and a short ID. Suppose the full ID corresponds to the first UE and the short ID corresponds to the second UE. Then, the full ID may refer to an ID that identifies the first UE in a globally unique manner or in a locally unique manner. In other words, the full ID may be unique in the entire network or only in some part of the entire network such as a special geographical area, a cell, etc. This is in consideration of the fact that the main concern for the sidelink is at the local level, which means the full ID needs to be unique at least at the local level. The short ID may refer to an ID that identifies the second UE uniquely among the UEs with which the first UE has simultaneous sidelinks. Thus, the short ID may take the form of multiple bits and the maximum value that can be represented by the multiple bits may be greater than or equal to the number of simultaneous sidelinks in which the first UE is or can be involved. In other words, the size (e.g. in terms of number of bits) of the short ID defines the number of sidelinks the first UE maintains or is able to maintain simultaneously. Note that the above definitions apply, mutatis mutandis, to the case that the full ID corresponds to the second UE and the short ID corresponds to the first UE.

As another example, the sidelink may be a multicast sidelink. The first UE may be a member of a first group of UEs (simply referred to as a first UE group) receiving multicast transmissions from the second UE, which may be called as case one. Alternatively, the second UE may be a member of a second group of UEs (simply referred to as a second UE group) receiving multicast transmissions from the first UE, which may be called as case two. Suppose the full ID corresponds to the first UE and the short ID corresponds to the second UE. Then, for case one, the full ID may refer to an ID that identifies the first UE group in a globally unique manner or in a locally unique manner. The short ID may refer to an ID that identifies the second UE uniquely among the UEs with which the first UE group has simultaneous sidelinks. In this case, one member from the first UE group may be designated to assign the short ID and inform it to the other members of the first UE group. That is, the full and short IDs may be defined based on multicast group of UEs. This means a group ID may be used as full or short ID. For instance, a group of receiving multicast UEs may be associated with one full ID or short ID. For case two, the full ID may refer to an ID that identifies the first UE in a globally unique manner or in a locally unique manner. The short ID may refer to an ID that identifies the second UE group uniquely among the UE groups (and possibly, UEs) with which the first UE has simultaneous sidelinks. Note that the above definitions apply, mutatis mutandis, to the case that the full ID corresponds to the second UE and the short ID corresponds to the first UE. Therefore, although some embodiments are described hereinafter by taking unicast sidelink as an example, those skilled in the art can understand that the principle of the present disclosure may also be applied to multicast sidelink.

In other words, instead of using globally unique identities of both destination and source UEs, each sidelink connection is identified by using a full ID of either source or destination UE (e.g. a globally unique identity, or a locally unique identity that is at least unique in the vicinity of the sidelink) and a short ID of either destination or source UE. In this way, a unique identifier can be configured or assigned to each sidelink connection such that simultaneous operation of multiple sidelinks can be allowed. Since the short ID is used, the overhead for uniquely identifying a sidelink transmission can be reduced.

Figure 3:
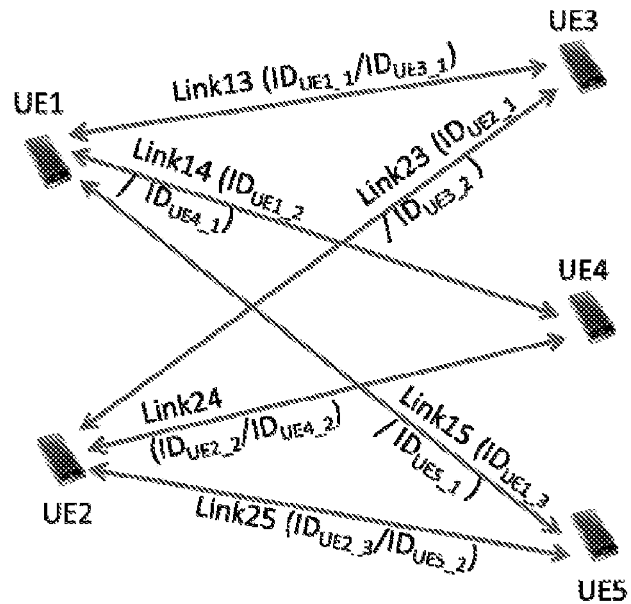
FIG. 3 shows an exemplary example for explaining the method of FIG. 2.

For instance, in the exemplary example shown in FIG. 3, there are five UEs in which both UE1 and UE2 are communicating with UE3, UE4 and UE5 over unicast sidelinks.

Thus, there are six unicast sidelinks, i.e. link13, link14, link15, link23, link24 and link25. The simplest and straightforward way to identify each unicast sidelink is to use globally unique IDs for both of the UEs. That is, a unicast link between UEm and UEn could be identified with $ID_{UEm\_UEn}$. However, given the large size of the globally unique ID (e.g. 24 bits for the layer-2 ID mentioned above), $ID_{UEm\_UEn}$ will be quite large in size (e.g. 48 bits). In contrast, when using a full ID plus a short ID as described above, the link could be identified with either $ID_{UEm\_j}$ or $ID_{k\_UEn}$, where j and k are short IDs each of which could be of small size, e.g. 2-4 bits, since a UE is not likely to simultaneously communicate with many UEs over sidelink. In this way, the relative overhead as compared to the actual sidelink payload information such as L1 control information (e.g. CSI report and HARQ Ack/Nack) can remain feasible.

Figure 4:
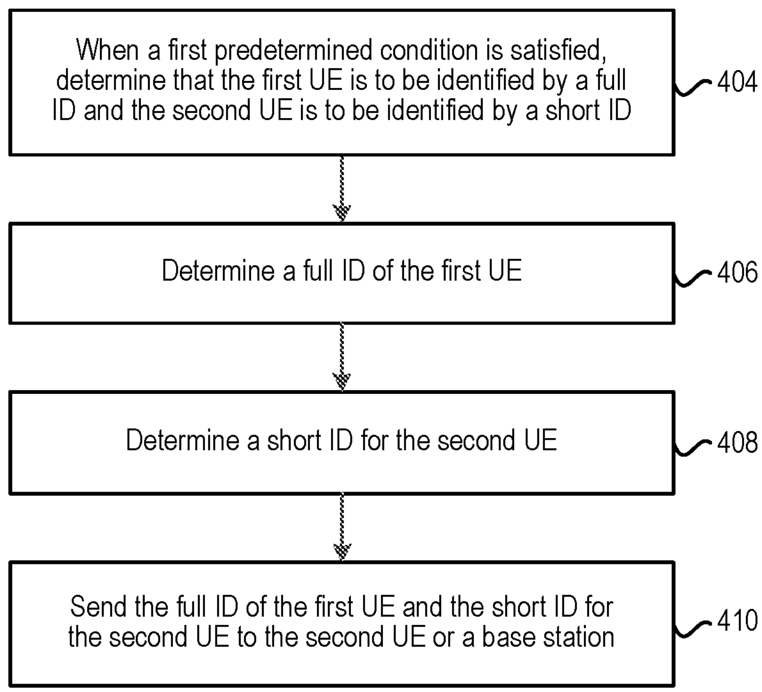
FIG. 4 is a flowchart for explaining the method of FIG. 2.
Figure 6:
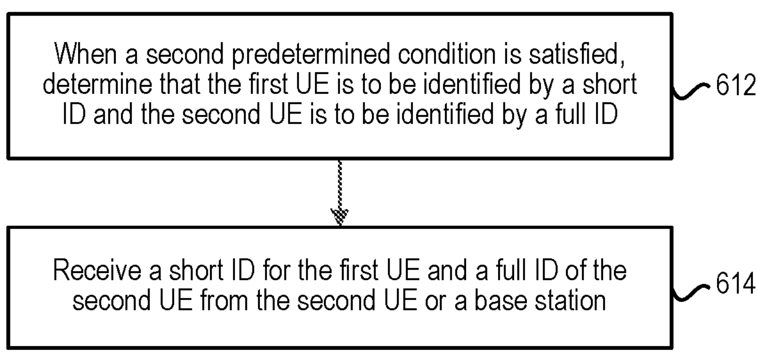
FIG. 6 is a flowchart for explaining the method of FIG. 2.
Figure 7A:
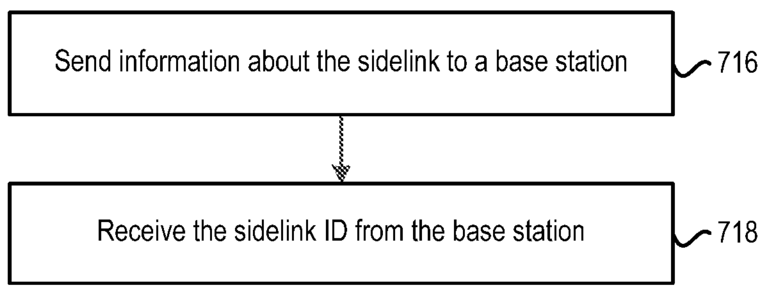
FIGS. 7A-7B are flowcharts each for explaining the method of FIG. 2.
Figure 7B:
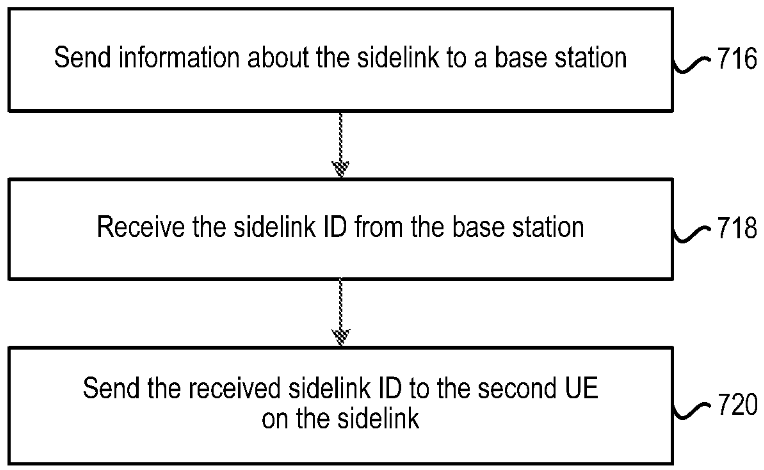

For example, block 202 may be implemented as blocks 404-410 of FIG. 4 (the first option), blocks 612-614 of FIG. 6 (the second option), blocks 716-718 of FIG. 7A (the third option), or blocks 716-720 of FIG. 7B (the fourth option). In the first option, at block 404, when a first predetermined condition is satisfied, the first UE determines that the first UE is to be identified by a full ID and the second UE is to be identified by a short ID. As the first example, the first predetermined condition is that the first UE is to receive data from the second UE. For instance, if the first UE is to receive CSI reports or HARQ Ack/Nack from the second UE, the first UE may determine to use a full ID for itself. In other words, the transmission (Tx) UE is to be indexed with a short ID. In the exemplary example of FIG. 3, for a transmission from UE2 to UE3, UE2 is to be indexed with a short ID. As the second example, the first predetermined condition is that the first UE is to transmit data to the second UE. For instance, if the first UE is to transmit CSI reports or HARQ Ack/Nack to the second UE, the first UE may determine to use a full ID for itself. In other words, the reception (Rx) UE is to be indexed with a short ID. In the exemplary example of FIG. 3, for a transmission from UE2 to UE3, UE3 is to be indexed with a short ID.

As the third example, the first predetermined condition is that the full ID of the first UE is smaller than the full ID of the second UE. The determination of the full ID will be described in detail later with respect to block 406. In other words, the UE with a larger full ID is to be indexed with a short ID. As the fourth example, the first predetermined condition is that the full ID of the first UE is larger than the full ID of the second UE. In other words, the UE with a smaller full ID is to be indexed with a short ID. As the fifth example, the first predetermined condition is that the number of simultaneous sidelinks in which the first UE is involved is smaller than the number of simultaneous sidelinks in which the second UE is involved. To make this comparison, the first UE may exchange the number of its simultaneous sidelinks with the second UE. In other words, the UE that is involved in a larger number of simultaneous sidelinks is to be indexed with a short ID. In the exemplary example of FIG. 3, UE2 is commutating over sidelinks with 3 UEs (i.e. UE3, UE4 and UE5), which means a 2-bit short ID will be needed to represent the 3 UEs if UE2 uses a full ID. However, UE3 is commutating over sidelinks with 2 UEs (i.e. UE1 and UE2), which means a 1-bit short ID will be needed to represent the 2 UEs if UE3 uses a full ID. Therefore, UE2 is to be indexed with a short ID.

As the sixth example, the first predetermined condition is that the first UE is a master UE and the second UE is a slave UE. For instance, in platooning use case, a platoon head may be considered as the master UE. If the first UE is the platoon head, the first UE may determine to use a full ID for itself. In other words, the slave UE is to be indexed with a short ID. Any one of the above first to sixth examples may be applied to the case where unconnected UEs (e.g. UEs that are not in RRC connected state such as UEs in RRC idle state or out-of-coverage UEs) perform a handshake procedure (during sidelink connection establishment phase or using sidelink signaling/data bearer) to assign (or configure) the short ID to ensure the uniqueness of the sidelink connection identity at least in the vicinity of the sidelink.

As the seventh example, the first predetermined condition is that the first UE is in coverage of a base station and the second UE is out of coverage of the base station. In other words, in this partial coverage scenario, the UE that is out of coverage is to be indexed with a short ID. Note that any one of the above first to sixth examples may also be applied to this partial coverage scenario. The above rules for the determination at block 404 may either be pre-configured (in the UE) or defined in technical specifications.

Figure 5:
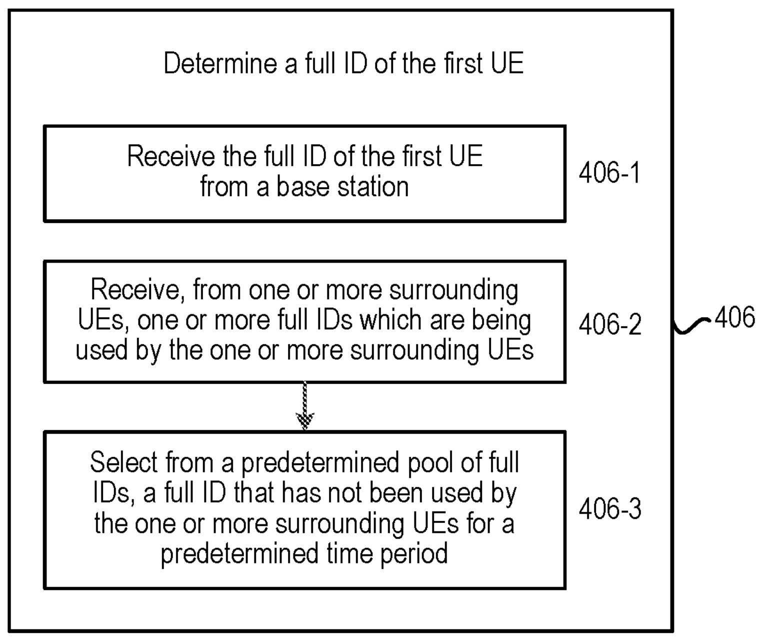
FIG. 5 is a flowchart for explaining the method of FIG. 4.

At block 406, a full ID of the first UE is determined. As described above, the full ID may be globally unique or locally unique. The globally unique ID may be allocated or preconfigured by the core network. For example, it may be a network address or a function thereof, such as the sidelink layer-2 ID or the like. In the case of the locally unique ID, block 406 may be implemented as block 406-1, or blocks 406-2 to 406-3 as shown in FIG. 5. At block 406-1, the full ID of the first UE is received from a base station. That is, for a UE in connected mode, the base station (e.g. eNB or gNB) may allocate an identity that is unique only in a certain geographical area (thus may be shorter than the globally unique ID), such as the C-RNTI mentioned above. The base station may reconfigure this identity at any point (e.g., when the UE moves to another geographical area). The size of the geographical area may be predefined or configured by the network.

Alternatively, at block 406-2, the first UE receives, from one or more surrounding UEs, one or more full IDs which are being used by the one or more surrounding UEs. The surrounding UEs may or may not have unicast communication with the first UE over sidelink. For example, the surrounding UEs which have unicast communication with the first UE may inform the first UE of the full IDs that the surrounding UEs have used during sidelink connection establishment or using signaling/data bearer. Alternatively, the surrounding UEs may transmit in broadcast (e.g. in discovery or over SL-SCH) the full IDs that they are using (and possibly also the full IDs that they overhear). At block 406-3, the first UE selects, as the full ID of the first UE, from a predetermined pool of full IDs, a full ID that has not been used by the one or more surrounding UEs for a predetermined time period. That is, if the first UE does not detect an ID for a predetermined amount of time, the first UE may consider the ID to be available. By avoiding using the detected (and possibly overheard) full IDs within the predetermined amount of time, the first UE may select a full ID that has not been used by itself or by any of the surrounding (or nearby) UEs. Note that for the above third and fourth examples of block 404, block 406 may be performed before block 404. Thus, two blocks shown in succession in any of the flowcharts may, in fact, be executed substantially concurrently, or the blocks may sometimes be executed in the reverse order, depending upon the functionality involved. Note that the full ID may also be allocated by other network (NW) node such as mobility management entity (MME), and the allocation procedure may be performed similar to that performed with the base station (e.g. Node B).

At block 408, a short ID is determined for the second UE. As described above, the short ID may take the form of multiple bits. The size of the short ID (e.g. the number of bits) may define the number of sidelinks the first UE maintains simultaneously. Alternatively, it may be configured based on the first UE's capability. For instance, if the first UE is able to maintain more simultaneous unicast sidelinks, the size of the short ID for the second UE is larger. It is also possible that the size of the short ID may be a value predetermined based on the highest capability of such kind of UEs. At block 410, the full ID of the first UE and the short ID for the second UE are sent to the second UE or a base station. In case the two IDs are sent to the base station, the base station may receive the two IDs from the first UE and then assign the sidelink ID comprising the two IDs to the second UE.

For instance, in the exemplary example shown in FIG. 3, suppose a sidelink ID needs to be configured to sidelink23. Then, for example, during connection establishment procedure, UE2 and UE3 may coordinate on which UE should be indexed with a short ID. Then, the UE indexed with a full ID may inform the peer UE which short ID it should use for indexing. Then, the sidelink ID comprising the full ID and the short ID may be used by one or both of UE2 and UE3 belonging to the sidelink23 to identify the sidelink23 on L1 if needed.

In the second option for block 202, at block 612, when a second predetermined condition is satisfied, the first UE determines that the first UE is to be identified by a short ID and the second UE is to be identified by a full ID. The second predetermined condition is opposite to the first predetermined condition and the detailed description thereof is omitted here for brevity. The full ID of the second UE may be determined in a way similar to block 406. Since the full ID is used by the second UE, the short ID for the first UE may be determined by the second UE in a way similar to block 408. At block 614, a short ID for the first UE and a full ID of the second UE are received from the second UE or a base station. In case the two IDs are received from the base station, the base station may receive the two IDs from the second UE and then assign the sidelink ID comprising the two IDs to the first UE.

In the third option for block 202, at block 716, information about the sidelink is sent to a base station. The details of the information about the sidelink will be described later with respect to FIG. 12. At block 718, the sidelink ID is received from the base station. In this case, the sidelink ID may be determined by the base station based on the received information about the sidelink and assigned to the second UE by the base station. That is, the base station may assign the sidelink ID to both the first and second UEs. Compared with the third option, the fourth option for block 202 additionally includes block 720. At block 720, the received sidelink ID is sent to the second UE on the sidelink. In this case, the sidelink ID may be determined by the base station and assigned to the first UE. Then, the first UE may assign the sidelink ID to the second UE via sidelink.

Figure 8:
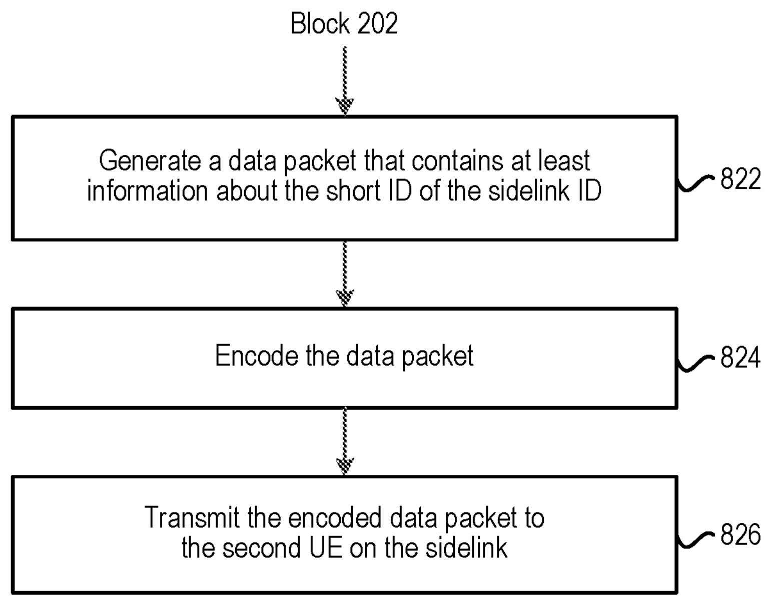
FIG. 8 is a flowchart illustrating a method implemented at a first UE according to another embodiment of the disclosure.

FIG. 8 is a flowchart illustrating a method implemented at a first UE according to another embodiment of the disclosure. As shown, the method comprises block 202 and blocks 822-826. Block 202 has been described above and its details are omitted here. At block 822, the first UE generates a data packet that contains at least information about the short ID of the sidelink ID. The data packet may carry L1 control signaling such as CSI reports or HARQ Ack/Nack. The information about the short ID may be the short ID itself, or its derivative such as a cyclic redundancy check (CRC) value obtained based on the short ID. For example, the obtained CRC may be calculated by scrambling a normal CRC with the short ID. The normal CRC may be calculated from the data packet by using various CRC techniques. Optionally, the data packet may further contain information about the full ID of the sidelink ID. The information about the full ID may be a derivative of the full ID, such as a CRC value obtained based on the full ID. At block 824, the data packet is encoded. Optionally, if the data packet does not contain the information about the full ID, block 824 may include scrambling the data packet with the full ID of the sidelink ID. On the other hand, if the data packet contains the information about the full ID, it is not necessary for block 824 to include the scrambling. At block 826, the encoded data packet is transmitted to the second UE on the sidelink.

As the first example for the method of FIG. 8, the data packet may contain a short ID for the first UE and a CRC value obtained based on a full ID of the second UE. Correspondingly, the second UE may decode the encoded data packet into the data packet, check the CRC value with the full ID of the second UE, and extract the short ID for the first UE from the data packet. In this way, the second UE may identify the sidelink based on the obtained two IDs. As the second example, the data packet may contain a short ID for the second UE and a CRC value obtained based on a full ID of the first UE. Correspondingly, the second UE may decode the encoded data packet into the data packet, check the CRC value with the full ID of the first UE, and extract the short ID for the second UE from the data packet. Note that if the second UE has simultaneous sidelinks with multiple UEs, the second UE may perform multiple CRC checks (one CRC check for each full ID).

As the third example, the data packet may contain a short ID for the first UE or a CRC value obtained based on the short ID for the first UE. The data packet may be scrambled with a full ID of the second UE. In other words, the packet may carry the short ID of the source UE or a CRC value obtained based on the short ID of the source UE (e.g. the UE sending the L1 control signaling). The data packet may be scrambled with the full ID of the destination UE (e.g. the UE receiving the L1 control signaling). In this way, the overhead may be further reduced by implicitly encoding the full ID (e.g., as part of a scrambling). Correspondingly, with the full ID of the second UE, the second UE may decode the encoded data packet into the data packet by applying the inverse scrambling to the scrambled data packet. If the packet carries the short ID for the first UE, the second UE may extract it. If the packet carries a CRC value obtained based on the short ID for the first UE, the second UE may check the packet with the short ID for the first UE.

It is also possible that the data packet may contain a full ID of the first UE and a CRC value obtained based on the short ID for the second UE. For example, the obtained CRC may be calculated by scrambling a normal CRC with the short ID. Correspondingly, the second UE may decode the encoded data packet into the data packet, extract the full ID of the first UE from the data packet, and check the CRC value with the short ID for the second UE (for example, by apply descrambling to the CRC value). However, in this case, the overhead is higher than the above three examples because the full ID is contained in the data packet.

Figure 9:
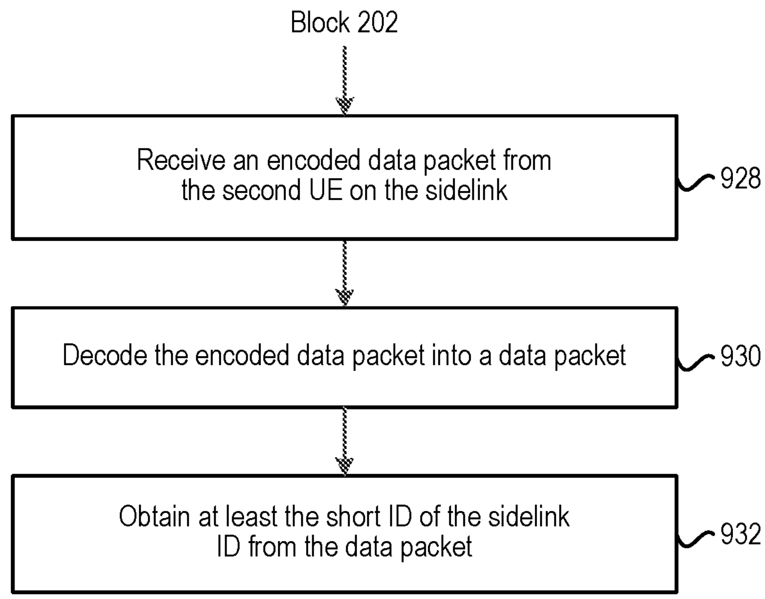
FIG. 9 is a flowchart illustrating a method implemented at a first UE according to another embodiment of the disclosure.

FIG. 9 is a flowchart illustrating a method implemented at a first UE according to another embodiment of the disclosure. As shown, the method comprises block 202 and blocks 928-932. Block 202 has been described above and its details are omitted here. At block 928, an encoded data packet is received from the second UE on the sidelink. The data packet may carry L1 control signaling such as CSI reports or HARQ Ack/Nack. Optionally, the encoded data packet may be a scrambled data packet. At block 930, the encoded data packet is decoded into a data packet. Optionally, block 930 may include descrambling, with the full ID of the sidelink ID, the scrambled data packet. At block 932, at least the short ID of the sidelink ID is obtained from the data packet. Optionally, if block 930 does not contain the descrambling, the full ID of the sidelink ID may be further obtained from the data packet.

As the first example for the method of FIG. 9, the short ID of the sidelink ID may be obtained by extracting a short ID for the first UE from the data packet. The full ID of the sidelink ID may be obtained by extracting a CRC value from the data packet and checking the CRC value with a full ID of the second UE. This example corresponds to the case where the data packet contains a short ID for the first UE and a CRC value obtained based on a full ID of the second UE. As the second example, the short ID of the sidelink ID may be obtained by extracting a short ID for the second UE from the data packet. The full ID of the sidelink ID may be obtained by extracting a CRC value from the data packet and checking the CRC value with a full ID of the first UE. This example corresponds to the case where the data packet contains a short ID for the second UE and a CRC value obtained based on a full ID of the first UE.

As the third example, the short ID of the sidelink ID may be obtained by extracting a short ID for the second UE from the data packet, or extracting a CRC value from the data packet and checking the CRC value with a short ID for the second UE. The encoded data packet may be decoded by descrambling, with the full ID of the first UE, a scrambled data packet. This example corresponds to the case where the data packet contains a short ID for the second UE or a CRC value obtained based on the short ID for the second UE, and the data packet is scrambled with a full ID of the first UE.

In the above three examples, a combination of the full ID and the short ID can be obtained and used to identify the data packet over the sidelink such that the first and second UEs can identify the sidelink therebetween. Note that in the above three examples, the first UE needs to apply a single scrambling sequence (corresponding to its full ID) but may need to perform multiple CRC checks (one CRC check for each short ID). From a complexity point of view, this is advantageous because only a single decoding is required and the complexity associated with checking CRCs is very low.

Figure 10:
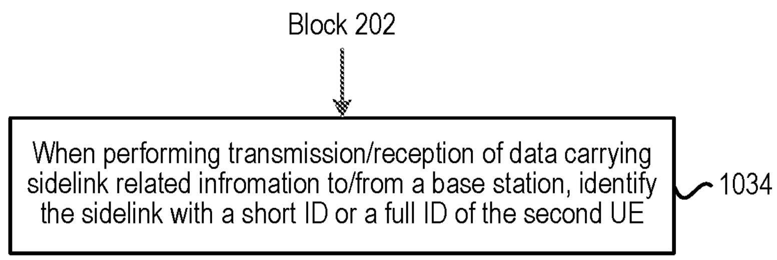
FIG. 10 is a flowchart illustrating a method implemented at a first UE according to another embodiment of the disclosure.

FIG. 10 is a flowchart illustrating a method implemented at a first UE according to another embodiment of the disclosure. As shown, the method comprises block 202 and block 1034. Block 202 has been described above and its details are omitted here. At block 1034, when performing transmission/reception of data carrying sidelink related information to/from a base station, the first UE identifies the sidelink with a short ID for the second UE or a full ID of the second UE. Since the purpose is to allow the base station to identify for which sidelink(s) the data transmitted/received to/from the base station is relevant, a single ID (e.g. either short ID or full ID) may be used to identify the sidelink(s) that the data packet over Uu deals with, because the other ID may be implicitly known by the base station (e.g., the base station already knows with which UE it is communicating). In the case of data transmission, as an example, information about the short ID for the second UE may be contained in a data packet transmitted to the base station. The information about the short ID may be the short ID itself, or its derivative such as a CRC value obtained based on the short ID. As another example, information about the full ID of the second UE may be contained in a data packet transmitted to the base station. The information about the full ID may be a derivative of the full ID, such as a CRC value obtained based on the full ID. As still another example, the data packet may be scrambled with the full ID of the second UE and transmitted to the base station. The implementing details for the case of data reception may be similar to those given for block 1434 which will be described later.

It should be noted that the values of the IDs may be different depending on whether a pair of UEs identify the sidelink or whether a base station (e.g. eNB or gNB) identifies a sidelink over the radio interface (e.g. Uu). For instance, in the exemplary example shown in FIG. 3, suppose the sidelink12 between UE1 and UE2 is considered. Then, from the point of view of UE1, this link may be identified with the full ID of UE1, a short ID=X corresponding to UE2 (agreed by UE1 and UE2 during e.g. the connection establishment). Note that the role of the IDs of UE1 and UE2 may be reversed. From the point of view of UE2, this link may be identified with the full ID of UE2, a short ID=Y corresponding to UE1 (agreed by UE1 and UE2 during e.g. the connection establishment). From the point of view of the base station serving UE1, the sidelink may be identified with a short ID=Z (agreed by UE1 and the base station) or the full ID of UE2. Note that X, Y and Z may be different or equal (X=Y, X=Z, Y=Z, X=Y=Z), depending on the specific application scenarios.

Figure 11:
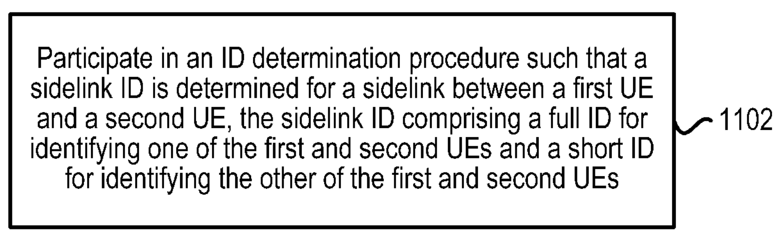
FIG. 11 is a flowchart illustrating a method implemented at a base station according to an embodiment of the disclosure.

FIG. 11 is a flowchart illustrating a method implemented at a base station according to an embodiment of the disclosure. For example, the base station may be a eNB or a gNB. At block 1102, the base station participates in an ID determination procedure such that a sidelink ID is determined for a sidelink between a first UE and a second UE. The sidelink ID comprises a full ID for identifying one of the first and second UEs and a short ID for identifying the other of the first and second UEs. Similar to block 202, instead of using globally unique identities of both destination and source UEs, each sidelink connection is identified by using a full ID of either source or destination UE (e.g. a globally unique identity, or a locally unique identity that is at least unique in the vicinity of the sidelink) and a short ID of either destination or source UE. In this way, a unique identifier can be configured or assigned to each sidelink connection such that simultaneous operation of multiple sidelinks can be allowed. Since the short ID is used, the overhead for uniquely identifying a sidelink transmission can be reduced.

Figure 12:
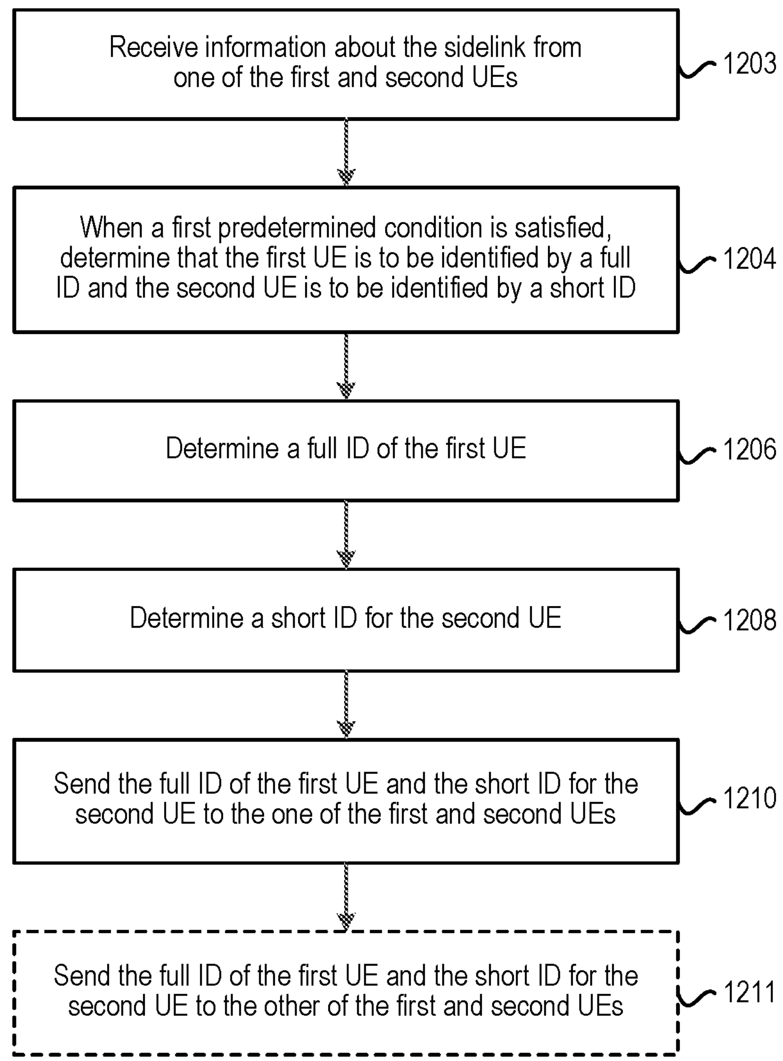
FIG. 12 is a flowchart for explaining the method of FIG. 11.
Figure 13:
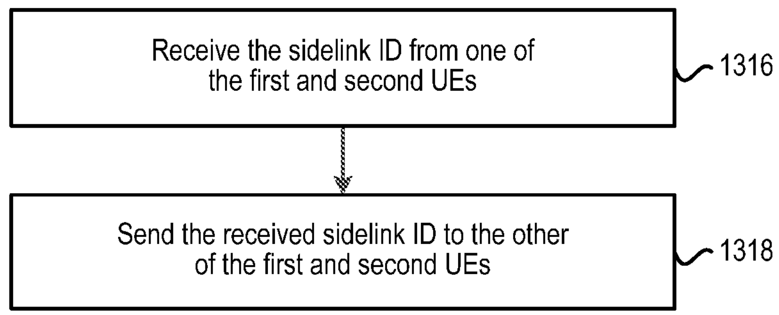
FIG. 13 is a flowchart for explaining the method of FIG. 11.

For example, block 1102 may be implemented as blocks 1203-1210 (and optionally block 1211) of FIG. 12 (the first option), or blocks 1316-1318 of FIG. 13 (the second option). In the first option for block 1102, at block 1203, information about the sidelink is received from one of the first and second UEs. Suppose the information is received from the first UE. Then, the information about the sidelink may at least include the number of simultaneous sidelinks in which the first UE is or can be involved.

At block 1204, when a first predetermined condition is satisfied, the base station determines that the first UE is to be identified by a full ID and the second UE is to be identified by a short ID. Apparently, the above mentioned criteria used by a UE for determining which UE should use full ID may also be used by the base station for the same purpose. As the first example, the first predetermined condition is that the first UE is to receive data from the second UE. As the second example, the first predetermined condition is that the first UE is to transmit data to the second UE. As the third example, the first predetermined condition is that the full ID of the first UE is smaller than the full ID of the second UE. As the fourth example, the first predetermined condition is that the full ID of the first UE is larger than the full ID of the second UE. Since the first UE communicates with the base station, the base station may know the full ID of the first UE. For instance, the full ID of the second UE may be included in the information about the sidelink such that the comparison can be performed in the third and fourth examples.

As the fifth example, the first predetermined condition is that the number of simultaneous sidelinks in which the first UE is involved is smaller than the number of simultaneous sidelinks in which the second UE is involved. As the sixth example, the first predetermined condition is that the first UE is a master UE and the second UE is a slave UE. To make this determination, the information about the sidelink may further indicate whether the first UE is a master UE or a slave UE. As the seventh example, the first predetermined condition is that the first UE is in coverage of a base station and the second UE is out of coverage of the base station. The above rules for the determination at block 1204 may either be pre-configured in the base station or defined in technical specifications.

At block 1206, a full ID of the first UE is determined. As described above, since the first UE communicates with the base station, the base station may know the full ID of the first UE. At block 1208, a short ID is determined for the second UE. As described above, the short ID may take the form of multiple bits and the maximum value that can be represented by the multiple bits may be greater than or equal to the number of simultaneous sidelinks in which the first UE is or can be involved. Since the information about the sidelink may include the number of simultaneous sidelinks, the short ID for the second UE may be determined based on the number of simultaneous sidelinks. At block 1210, the full ID of the first UE and the short ID for the second UE are sent to the one of the first and second UEs. In this case, the sidelink comprising the two IDs may be informed to the second UE by the first UE. Optionally, at block 1211, the full ID of the first UE and the short ID for the second UE are sent to the other of the first and second UEs. In this case, the sidelink comprising the two IDs may be assigned to both the first and second UEs by the base station.

According to the embodiment of FIG. 12, connected mode UEs may report information about their sidelink connections to the base station. Based on any of the rules described above, the base station may decide which UE should be indexed with a short ID. Based on the reported information, the base station may allocate unique identity for each sidelink connection (e.g. unicast or multicast sidelink connection).

In the second option for block 1102, at block 1316, the sidelink ID is received from one of the first and second UEs. The sidelink ID may be determined by the one of the first and second UEs as described above with respect to blocks 404-410 of FIG. 4. At block 1318, the received sidelink ID is sent to the other of the first and second UEs. Thus, according the second option, the UE may determine by itself the ID for identifying each sidelink and convey this information to the base station. The base station may configure the different UEs involved in a sidelink.

Figure 14:
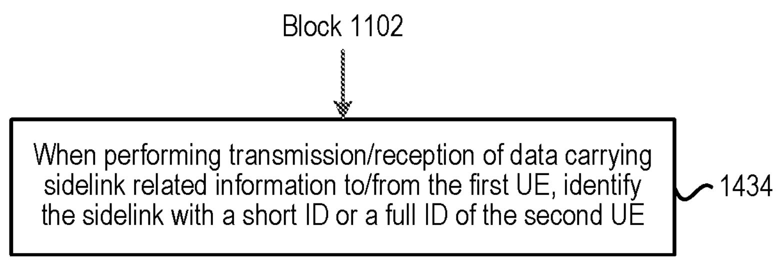
FIG. 14 is a flowchart illustrating a method implemented at a base station according to another embodiment of the disclosure.

FIG. 14 is a flowchart illustrating a method implemented at a base station according to another embodiment of the disclosure. As shown, the method comprises block 1102 and block 1434. Block 1102 has been described above and its details are omitted here. At block 1434, when performing transmission/reception of data carrying sidelink related information to/from the first UE, the base station identifies the sidelink with a short ID for the second UE or a full ID of the second UE. The method of FIG. 14 corresponds to the method of FIG. 10. In the case of data reception, as an example, the short ID for the second UE may be obtained by decoding an encoded data packet (transmitted or relayed) from the first UE into a data packet and extracting the short ID for the second UE from the data packet. As another example, the short ID for the second UE may be obtained by decoding an encoded data packet from the first UE into a data packet, extracting a CRC value from the data packet, and checking the CRC value with the short ID for the second UE. As still another example, the full ID of the second UE may be obtained by decoding an encoded data packet from the first UE into a data packet, extracting a CRC value from the data packet, and checking the CRC value with the full ID of the second UE. As still another example, the full ID of the second UE may be obtained by descrambling a scrambled data packet from the first UE to a data packet by using the full ID of the second UE. The implementing details for the case of data transmission may be similar to those given for block 1034 which has been described above.

Figure 15:
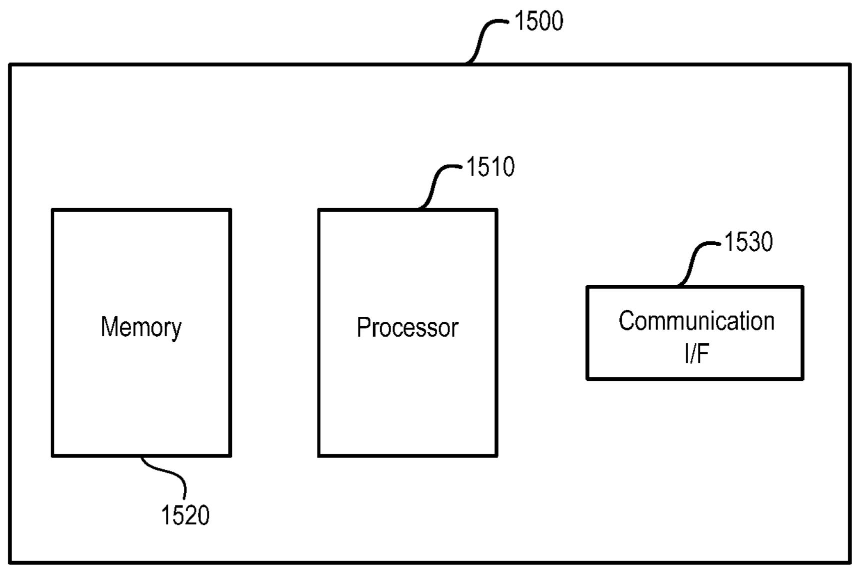
FIG. 15 is a block diagram showing an apparatus suitable for use in practicing some embodiments of the disclosure.

FIG. 15 is a block diagram showing an apparatus suitable for use in practicing some embodiments of the disclosure. For example, any one of the UE and the base station described above may be implemented through the apparatus 1500. As shown, the apparatus 1500 may include a processor 1510, a memory 1520 that stores a program, and a communication interface 1530 for communicating data with other external devices through wired and/or wireless communication.

The program includes program instructions that, when executed by the processor 1510, enable the apparatus 1500 to operate in accordance with the embodiments of the present disclosure, as discussed above. That is, the embodiments of the present disclosure may be implemented at least in part by computer software executable by the processor 1510, or by hardware, or by a combination of software and hardware.

The memory 1520 may be of any type suitable to the local technical environment and may be implemented using any suitable data storage technology, such as semiconductor based memory devices, flash memory, magnetic memory devices and systems, optical memory devices and systems, fixed memory and removable memory. The processor 1510 may be of any type suitable to the local technical environment, and may include one or more of general purpose computers, special purpose computers, microprocessors, digital signal processors (DSPs) and processors based on multi-core processor architectures, as non-limiting examples.

As another embodiment, the first UE may comprise a participation module configured to participate in an ID determination procedure such that a sidelink ID is determined for a sidelink between the first UE and a second UE, as described above with respect to block 202. The sidelink ID comprises a full ID for identifying one of the first and second UEs and a short ID for identifying the other of the first and second UEs.

As another embodiment, the base station may comprise a participation module configured to participate in an ID determination procedure such that a sidelink ID is determined for a sidelink between a first UE and a second UE, as described above with respect to block 1102. The sidelink ID comprises a full ID for identifying one of the first and second UEs and a short ID for identifying the other of the first and second UEs. The modules described above may be implemented by hardware, or software, or a combination of both.

Figure 16:
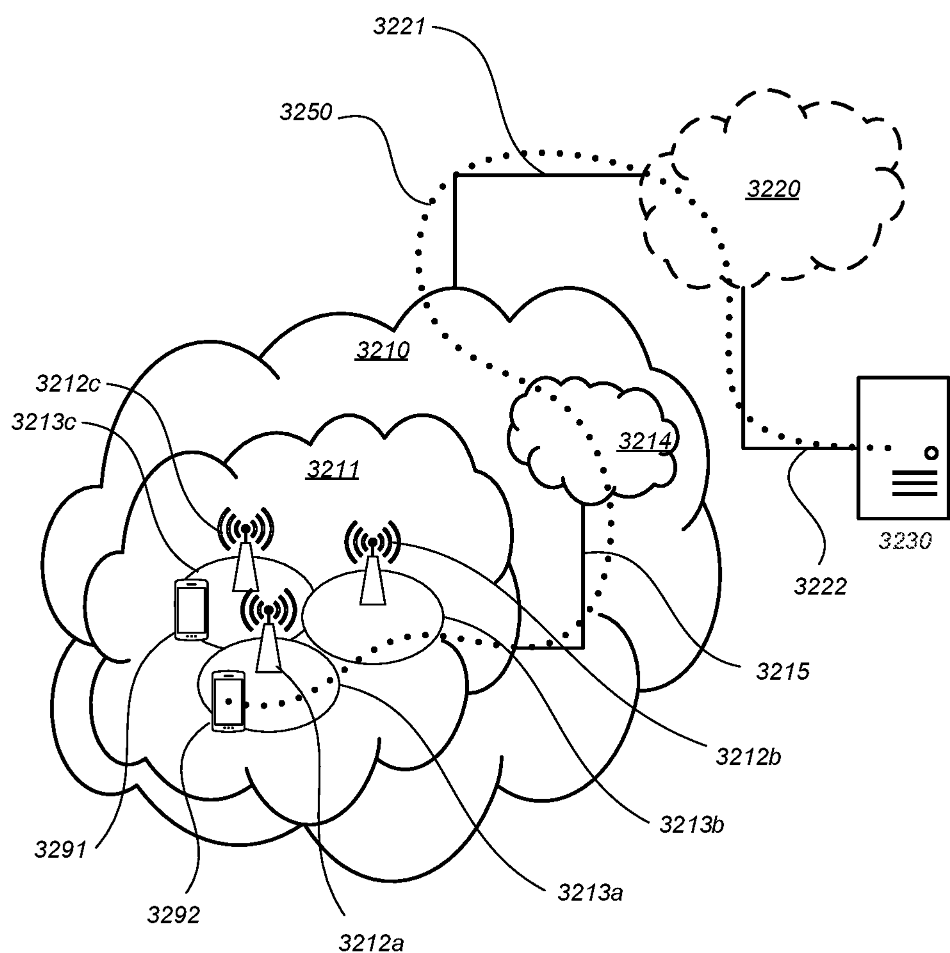
FIG. 16 is a diagram showing a telecommunication network connected via an intermediate network to a host computer in accordance with some embodiments.

With reference to FIG. 16, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 16 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 17) served by base station 3320. Communication interface 3326 may be configured to facilitate connection 3360 to host computer 3310. Connection 3360 may be direct or it may pass through a core network (not shown in FIG. 17) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 17:
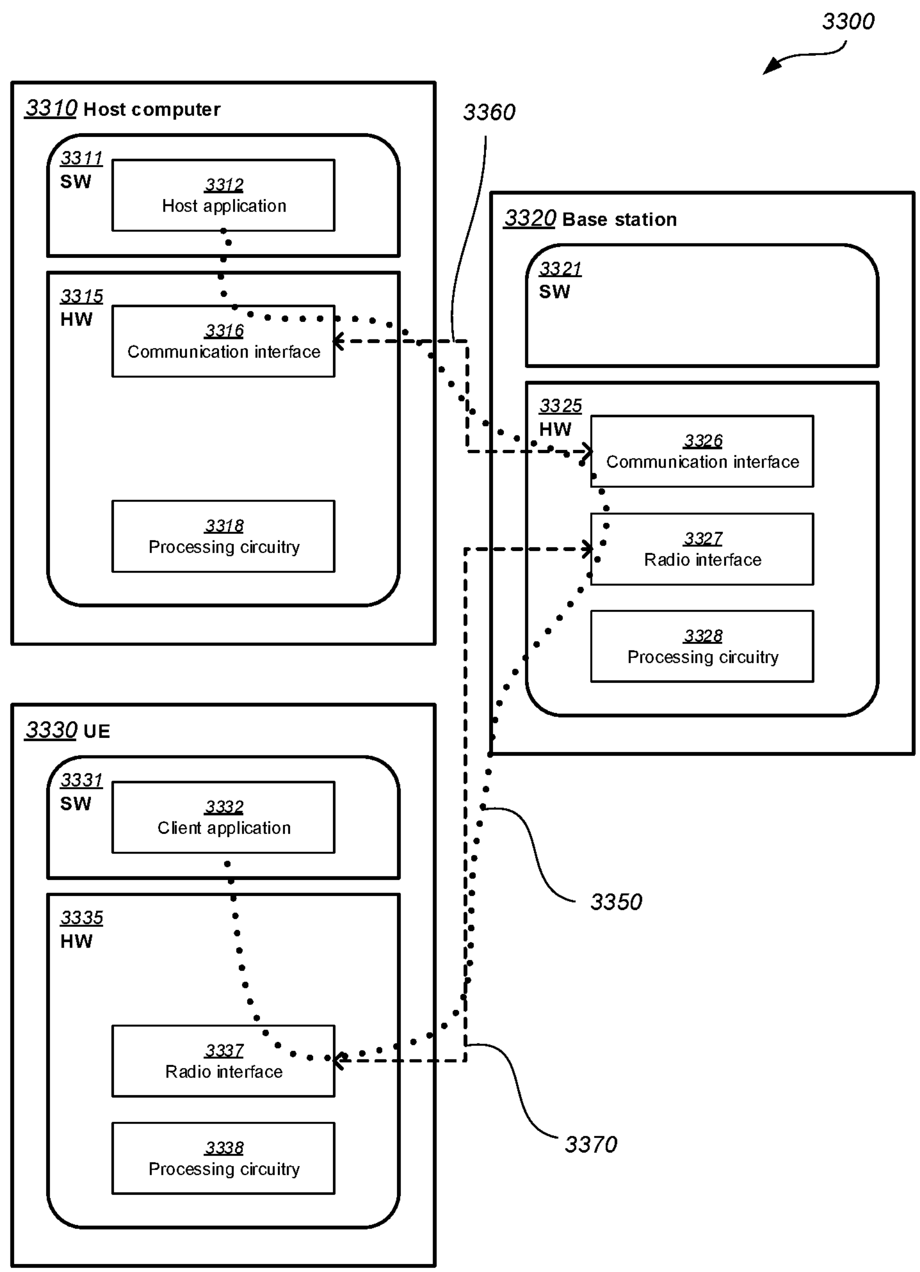
FIG. 17 is a diagram showing a host computer communicating via a base station with a user equipment in accordance with some embodiments.

It is noted that host computer 3310, base station 3320 and UE 3330 illustrated in FIG. 17 may be similar or identical to host computer 3230, one of base stations 3212*a*, 3212*b*, 3212*c* and one of UEs 3291, 3292 of FIG. 16, respectively. This is to say, the inner workings of these entities may be as shown in FIG. 17 and independently, the surrounding network topology may be that of FIG. 16.

In FIG. 17, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 18:
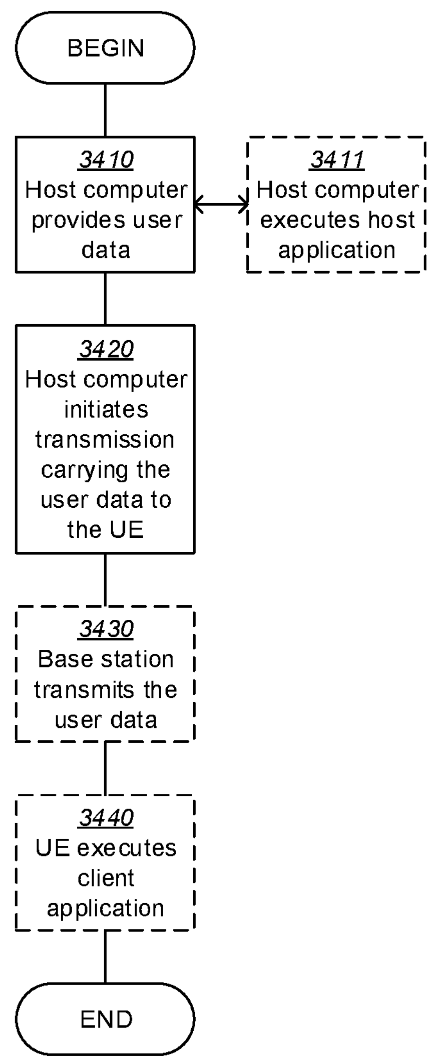
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 19:
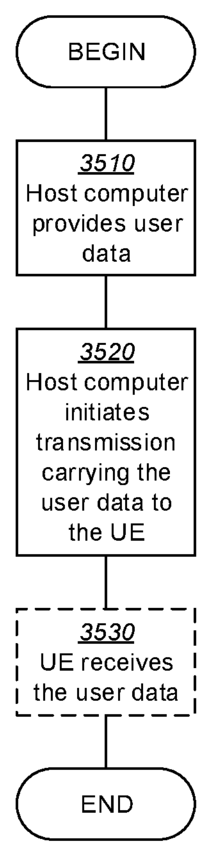
FIG. 19 is a flowchart illustrating a methods implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 20:
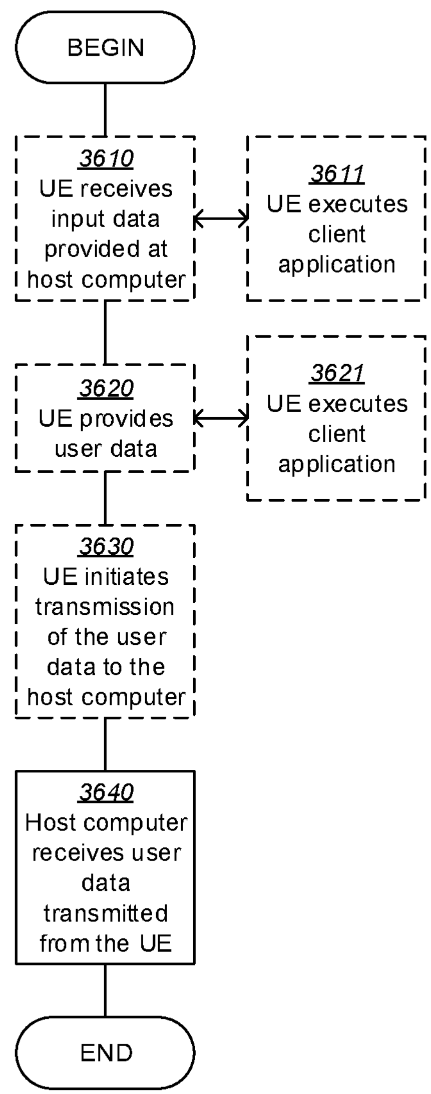
FIG. 20 is a flowchart illustrating a method implemented in a communication system in accordance with some embodiments.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 21:
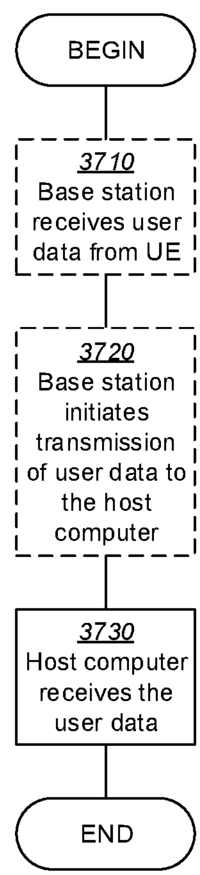
FIG. 21 is a flowchart illustrating a method implemented in a communication system in accordance with some embodiments.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a first user equipment (UE), the method comprising:

sending or receiving a communication carrying data related to a sidelink between the first UE and a second UE; and identifying the sidelink to which the data relates using a sidelink ID, the sidelink ID comprising a full identity (ID) for identifying one of the first and second UEs and a short ID for identifying the other of the first and second UEs, the full ID being longer than the short ID and the short ID uniquely identifying the second UE among a plurality of UEs with which the first UE has simultaneous sidelinks.

2. The method of claim 1, wherein the method comprises:

in response to a first predetermined condition being satisfied, determining that the first UE is to be identified in the sidelink ID by the full ID and the second UE is to be identified in the sidelink ID by the short ID;

determining the full ID for the first UE;

determining the short ID for the second UE; and sending the full ID of the first UE and the short ID for the second UE to the second UE or a base station.

3. The method of claim 1, wherein the method comprises:

in response to a second predetermined condition being satisfied, determining that the first UE is to be identified in the sidelink ID by the short ID and the second UE is to be identified in the sidelink ID by the full ID; and receiving the short ID for the first UE and the full ID of the second UE from the second UE or a base station.

4. The method of claim 2, wherein the full ID is a locally unique ID;

and wherein determining the full ID comprises receiving the full ID of the first UE from a base station.

5. The method of claim 2, wherein the full ID is a locally unique ID, and wherein determining the full ID comprises:

receiving, from one or more surrounding UEs, one or more full IDs which are being used by the one or more surrounding UEs; and selecting, as the full ID of the first UE, from a predetermined pool of full IDs, a full ID that has not been used by the one or more surrounding UEs for a predetermined time period.

6. The method of claim 2, wherein the short ID is determined for the second UE based on a number of simultaneous sidelinks in which the first UE is or can be involved.

7. The method of claim 1, wherein the method comprises:

sending information about the sidelink to a base station; and receiving the sidelink ID from the base station.

8. The method of claim 7, further comprising:

sending the received sidelink ID to the second UE on the sidelink.

9. The method of claim 7, wherein the information about the sidelink comprises a full ID of the second UE and a number of simultaneous sidelinks in which the first UE is or can be involved.

10. The method of claim 1, further comprising:

generating a data packet that contains at least information about the short ID of the sidelink ID;

encoding the data packet; and transmitting the encoded data packet to the second UE on the sidelink; and wherein the data packet further contains information about the full ID of the sidelink ID, or wherein encoding the data packet comprises scrambling the data packet with the full ID of the sidelink ID.

11. The method of claim 1, further comprising:

receiving an encoded data packet from the second UE on the sidelink;

decoding the encoded data packet into a data packet; and obtaining at least the short ID of the sidelink ID from the data packet; and wherein decoding the encoded data packet comprises descrambling, with the full ID of the sidelink ID, a scrambled data packet, or wherein the full ID of the sidelink ID is further obtained from the data packet.

12. The method of claim 1, wherein the sidelink is a unicast sidelink or a multicast sidelink, and the sidelink ID is used to identify the sidelink on layer 1 (L1).

13. A method implemented at a base station, the method comprising:

sending or receiving a communication carrying data related to a sidelink between a first UE and a second UE; and identifying the sidelink to which the data relates using a sidelink ID, the sidelink ID comprising a full identity (ID) for identifying one of the first and second UEs and a short ID for identifying the other of the first and second UEs, the full ID being longer than the short ID and the short ID uniquely identifying the second UE among a plurality of UEs with which the first UE has simultaneous sidelinks.

14. The method of claim 13, wherein the method comprises:

receiving information about the sidelink from one of the first and second UEs;

in response to a first predetermined condition being satisfied, determining that the first UE is to be identified in the sidelink ID by the full ID and the second UE is to be identified in the sidelink ID by the short ID;

determining the full ID for the first UE;

determining the short ID for the second UE; and sending the full ID of the first UE and the short ID for the second UE to the one of the first and second UEs.

15. The method of claim 14, further comprising:

sending the full ID of the first UE and the short ID for the second UE to the other of the first and second UEs.

16. The method of claim 14, wherein the short ID is determined for the second UE based on a number of simultaneous sidelinks in which the first UE is or can be involved.

17. The method of claim 13, wherein the method comprises:

receiving the sidelink ID from one of the first and second UEs; and sending the received sidelink ID to the other of the first and second UEs.

18. A first user equipment (UE), comprising:

at least one processor; and at least one memory, the at least one memory containing instructions executable by the at least one processor, whereby the first UE is operative to:

send or receive a communication carrying data related to a sidelink between the first UE and a second UE; and identify the sidelink to which the data relates using a sidelink ID, the sidelink ID comprising a full identity (ID) for identifying one of the first and second UEs and a short ID for identifying the other of the first and second UEs, the full ID being longer than the short ID and the short ID uniquely identifying the second UE among a plurality of UEs with which the first UE has simultaneous sidelinks.

* * * * *